(No Model.)

T. P. MILLIGAN.
APPARATUS FOR MAKING GLUE.

No. 247,573. Patented Sept. 27, 1881.

Attest:
Chas. M. Little
C. C. Herrick

Inventor.
Thos. P. Milligan, per
Thos. S. Crane, Atty.

N. PETERS, Photo-Lithographer, Washington, D. C.

UNITED STATES PATENT OFFICE.

THOMAS P. MILLIGAN, OF SOUTH ORANGE, NEW JERSEY.

APPARATUS FOR MAKING GLUE.

SPECIFICATION forming part of Letters Patent No. 247,573, dated September 27, 1881.

Application filed May 31, 1881. (No model.)

*To all whom it may concern:*

Be it known that I, THOS. P. MILLIGAN, a citizen of the United States, residing in South Orange, in the county of Essex and State of New Jersey, have invented certain new and useful Improvements in Apparatus for Making Glue, &c., fully described and represented in the following specification and the accompanying drawings, forming a part of the same.

My invention relates to an improvement in apparatus for making glue, gelatine, and size; and it consists, first, in combining with an air-tight glue-boiler a grate located near the bottom, and proper outlets to draw off a portion of the charge from time to time before the entire mass of stock is reduced; also, in combining with a series of steam-inlets, arranged about the sides of the boiler at intervals, a series of thermometers to indicate the degree of heat at different points; also, in a safety-valve and steam-inlet applied to the top of the boiler, for controlling the circulation and pressure of steam inside the boiler; also, in a filter or strainer of any construction, in combination with each of the outlets provided beneath the grate.

Figure 1:
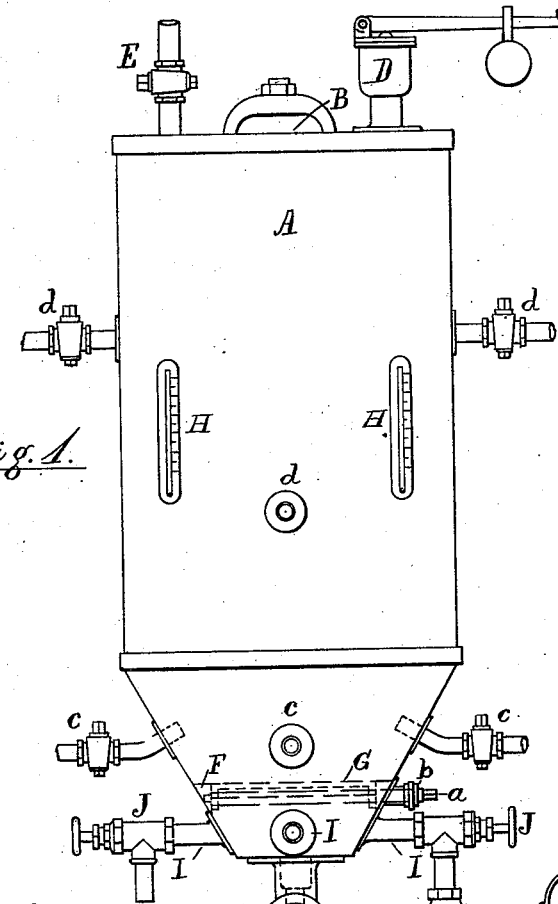
Figure 3:
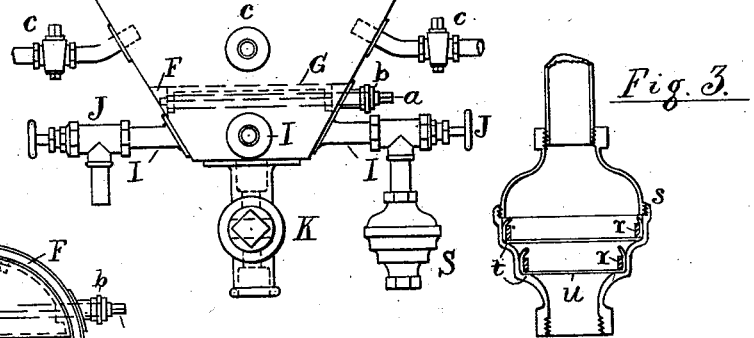
Figure 2:
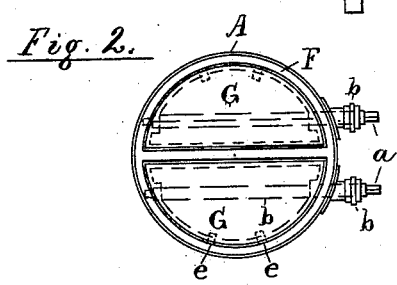
Figure 4:
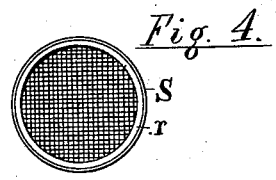

Figure 1 of the drawings is a side elevation of a glue-boiler supplied with my improvements. Fig. 2 is a plan of the grate. Fig. 3 is a vertical section through the center of the strainer, and Fig. 4 a plan of one of the rings and its straining-cloth.

The process for which my apparatus is especially designed will first be described, that the construction and operation of the mechanism may be better understood, the said process consisting in the following operations: first, conducting a circulation of steam from open jets throughout the mass while a temperature near the boiling-point of water, or any proper temperature adapted to properly cook the stock, is maintained at a nearly uniform degree throughout the vessel by the aid of a series of steam-jets and thermometers; second, in reducing the temperature below 170° Fahrenheit, and maintaining it at such point by the aid of a series of steam-jets and thermometers while steam is admitted to the top of the boiler, to produce a pressure upon its contents without elevating their temperature, as is the case when diffused throughout by an active circulation; third, in drawing off the fluid gelatine from time to time and subjecting the remaining contents to continued pressure without elevating its temperature.

In the annexed drawings, A is the boiler; B, a man-hole to introduce the stock; K, a discharge-cock to draw off the refuse; D, a safety-valve; E, a steam-cock upon the top of the boiler; F, a ring fitted to the inside of the boiler, near the bottom, which is preferably made of tapering form, as shown in Fig. 1.

G is a grate, shown fitted to the ring F in two sections, each of which is provided with a dumping-shaft, $a$, by which it can be tipped when it is desired to discharge the contents of the boiler through the cock C.

Stops $e\ e$ are formed upon the ring at proper points to sustain the grate when in use, the portion of the grate resting upon the stops being made a little larger in area than that upon the opposite side of the dumping-shaft to prevent its tipping automatically, and the end of the shaft is shown squared to receive a wrench, but may, if preferred, be provided with a lever permanently fastened thereto.

$b\ b$ are stuffing-boxes fitted to the shafts $a\ a$ to prevent leakage.

$c\ c$ are cocks supplying steam to four jets, $e$, arranged just above the grate.

$d\ d$ are four cocks arranged at different points around the body of the boiler, with thermometers H fixed to the shell between them and projected inside the boiler sufficiently to indicate the temperature of the stock at that point.

S is a strainer, shown attached to one of four outlets, I, inserted into the boiler beneath the grate, and each provided with a cock, J, to draw off the solution when desired. The strainer is made of two shells coupled together at $s$, the upper shell being provided with a screw-thread to fit on the outlet-pipe, and both shells being expanded at the coupling $s$ to admit a strainer of considerable area. The lower shell is adapted to support two rings, $r$, upon ledges $t$ in its interior, the upper ledge being larger than the lower, that both may be inserted with ease when the shells are uncoupled.

The straining material consists of a circular piece, $u$, of woven fabric, as flannel, laid upon the ring and pressed against the ledge in the shell, where it is retained when in use by the weight of the ring and the pressure of the escaping fluid. The liquid passes through the flannel stretched over both rings in its passage through the filter, and is thus rendered perfectly clear when received in a tank or vessel outside of the boiler.

I have not claimed the above filter herein, as I shall make it the subject of a separate application.

The grate G is provided with holes about one-quarter of an inch in diameter, and is preferably made of cast-iron, such holes proving in practice to pass the material through only when reduced to a fluid condition.

The apparatus above described is operated as follows: The boiler is filled about three-fourths full of stock, and a proper quantity of water introduced with it to reduce the same to a thick solution. The man-hole is then closed, and steam admitted at the various cocks c and d to boil or cook the stock for about an hour, a circulation being secured by raising the safety-valve during that period.

The temperature subsequently required to secure a product of the highest quality is seldom above 150° Fahrenheit, and to prevent any great excess above such temperature in any part of the boiler I make use of the series of cocks c d, some eight in number, which afford a means of checking the influx of steam at any point when the thermometer at such point indicates too high a degree of heat.

During the cooking of the stock, also, the thermometers are therefore watched, and the supply of steam at the jets regulated therewith, and the mass inside the boiler at the close of such operation is therefore at a uniform temperature throughout, and such temperature is materially lower than that of the steam employed. This is a very desirable result, and is secured by the diffusion of the steam into the mass at so many points and its regulation with the aid of the thermometers.

The next step in the process consists in subjecting the contents of the boiler to steam-pressure without increasing the temperature, for the purpose of concentrating the liquid and securing a product of great consistency without further evaporation.

As it is well known that the temperature of steam increases with its pressure, it is obvious that some peculiar arrangement is required to subject the stock to such pressure by the use of steam when the boiler is closed and there is no escape of vapor to conduct off the heat. This I find can be accomplished practically by introducing steam at the top of the boiler when all the outlets are closed, the pressure then operating without the introduction of any current of steam or any volume, except that required to fill the top of the boiler. Under pressure thus applied I find that there is no injurious increase of temperature, but that the stock is rapidly reduced to a fluid of great consistency. The space beneath the grate becomes filled with such fluid, and to draw it off without producing a pressure of the stock upon the grate, which would result in clogging all its openings, I discharge the steam-pressure by closing valve E and opening the safety-valve.

By applying a filter, as shown at S, to each of the four outlets I beneath the grate, the solution is not only clarified, but drawn off with much greater rapidity than if a single opening were used. The use of four filters at once also affords an opportunity for cleaning the straining-cloths in one filter, should it become clogged, without arresting the draining operation, which, from the peculiar nature of the material, requires to be done with rapidity and promptness when the proper time has been reached in the reduction of the crude material. With some kinds of stock, for instance, the reduction to a fluid form is slow and progressive, and a considerable time is required to effect the reduction of the entire mass. In such cases the combination of the grate and means for applying pressure to the stock at the top of the vessel and the outlets at the bottom beneath the grate enables me to draw off from time to time the fluid gelatine when it has reached the proper consistency, the stock remaining in the boiler being resupplied with water and subjected to renewed pressure without elevating the temperature again to the degree required for the original cooking.

During the successive treatments of the same stock the temperature can be kept uniform throughout the vessel by the use of the series of steam-jets arranged at the base and around the body of the boiler, and if the thermometers indicate too low a degree of heat in general, as may result from the radiation when the cooking process is concluded, the safety-valve would be opened and a slight circulation of steam be induced, in connection with the jets, as employed during the earlier stages of the process.

From the above description it will be seen that the function of the safety-valve is twofold, in that it is used to let out either pressure or vapor when required, while it is constantly of use to indicate any excess of pressure and its accompanying heat which may arise from the neglect of the operative.

As an excess of heat is so injurious to glue-stock, the usefulness of a safety-valve will be readily understood; but it is evident that my process can be carried out by the aid of a mere blow-off cock if strict attention is given to the operations involved. In like manner the dumping devices may be dispensed with and a fixed grate be employed to separate the stock above from the fluid gelatine below, and in such case the waste-cock K would not be required, but a man-hole would be inserted in the shell of the boiler, above the grate, to clean out the refuse, as required.

I may also introduce the steam-pressure by a cock in the side of the boiler, instead of at the top, as at E, or make any other change which will not affect the operations to be performed in the manner herein described.

I am aware that it is not new to boil glue in an air-tight vessel or to admit steam thereto during such boiling or cooking operation; but as the operations I perform by the use of my improved apparatus are materially different from those effected by any previously employed, and as I find the construction I have devised essential to the success of the methods I employ, I claim the devices herein described in the following manner:

1. In combination with an air-tight vessel for reducing glue-stock, provided with a man-hole and outlets for withdrawing the product, a series of steam-jets inserted at various points in its shell and provided with regulating-valves, as herein described, and a series of thermometers adapted to indicate the temperature at various points affected by the jets, substantially as herein set forth.

2. In combination with an air-tight vessel provided with a man-hole and outlets for the purpose set forth, a series of steam-jets inserted in the shell of the vessel at various points, and a grate arranged and operated to sustain the stock above the level of the outlets, substantially as shown and described.

3. In combination with an air-tight vessel provided with a man-hole and outlets for the purpose set forth, a series of steam-jets inserted in the shell at various points, a grate provided with means for opening or dumping it to release the entire contents from the vessel, and a waste-cock beneath the grate, to discharge or retain the contents at pleasure, substantially as herein set forth.

4. In combination with a glue-boiler having a series of outlets and a grate arranged to sustain the stock above their level in the manner described, a pipe and a cock for each outlet, and a filter applied to each, and operated substantially as herein set forth.

5. In a glue-boiler, the combination, with an air-tight vessel having a man-hole and outlets for the purpose described, of a grate arranged above the outlets, one or more steam-jets inserted in the vessel near the upper surface of the grate to heat the lower part of the contents, one or more steam-jets inserted near the middle of the height to heat the body of the contents, a steam-inlet near the top to furnish pressure when required, and a safety-valve to promote circulation and indicate the pressure, the whole combined and operated substantially as and for the purpose set forth.

In testimony whereof I have hereunto set my hand in the presence of two subscribing witnesses.

THOS. P. MILLIGAN.

Witnesses:
CHAS. M. LITTLE,
THOS. S. CRANE.